June 29, 1965
M. SCHWARTZ ETAL
3,191,494
COMBINED PHOTOGRAPHIC TRANSPARENCY AND
STATIONARY SPIRAL-SHAPED SOUND
TRACK CARRIER SUPPORT FRAME
Original Filed July 9, 1954
3 Sheets-Sheet 1
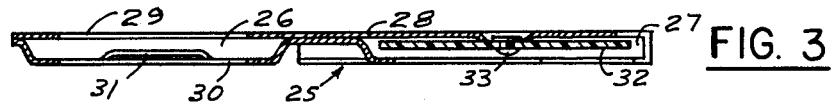
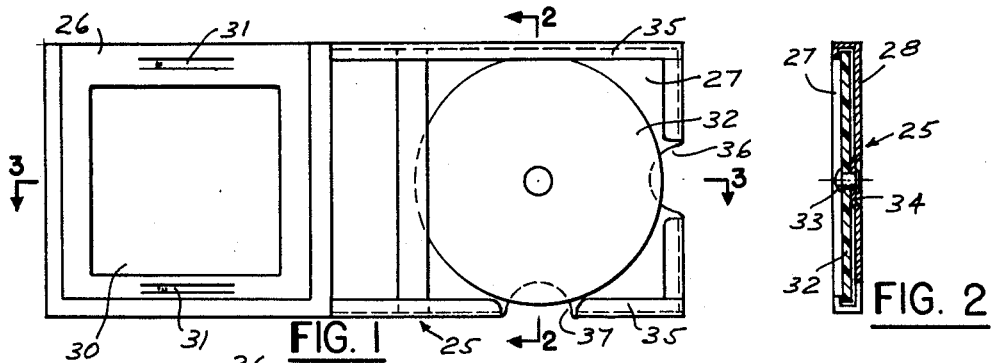
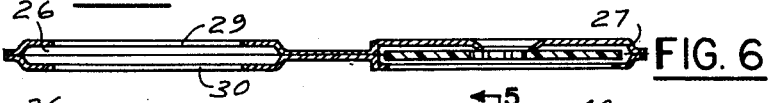
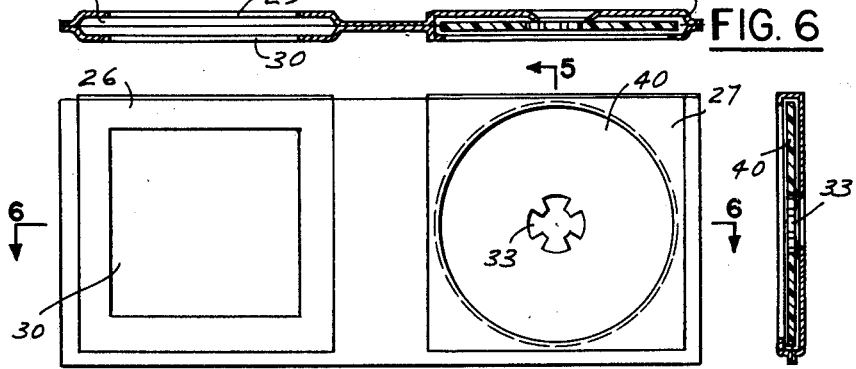
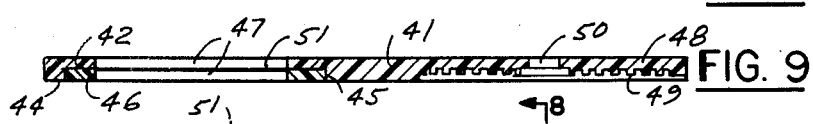
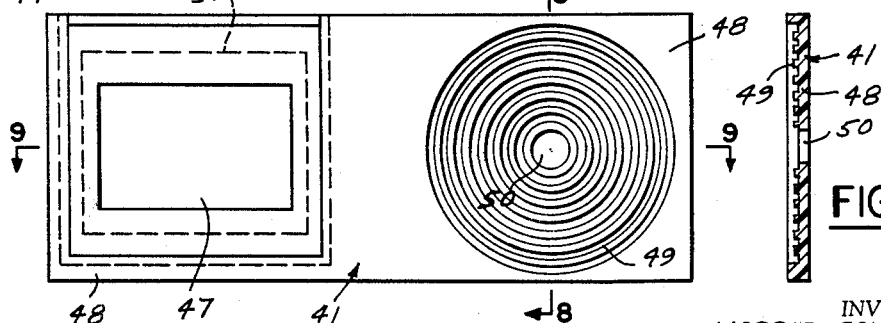
INVENTORS
MORRIS SCHWARTZ
EDWARD K. KAPRELIAN
BY
ATTORNEYS

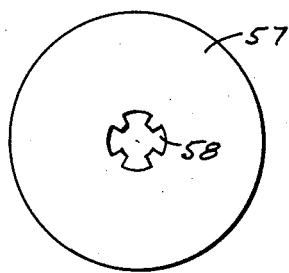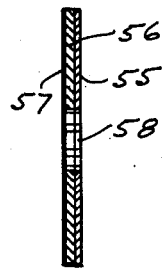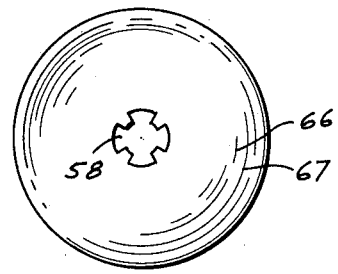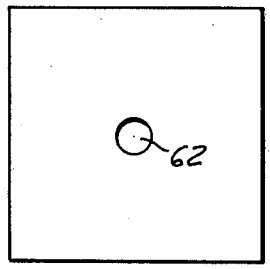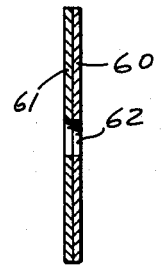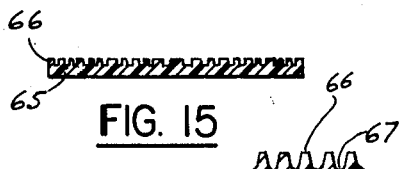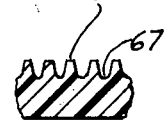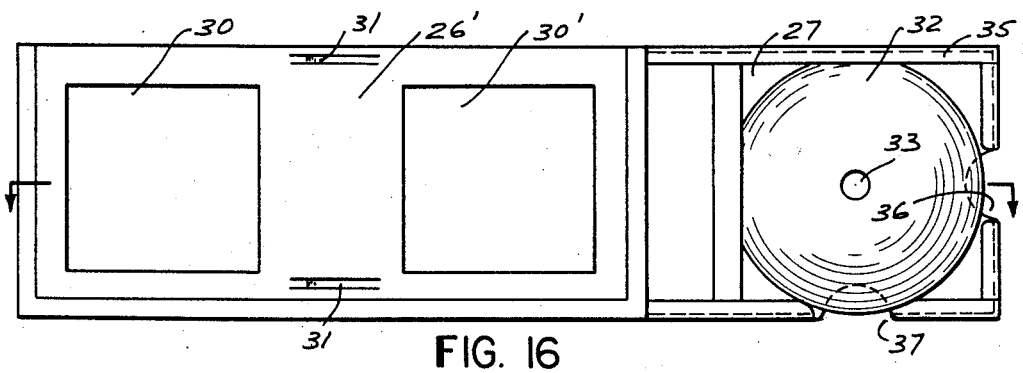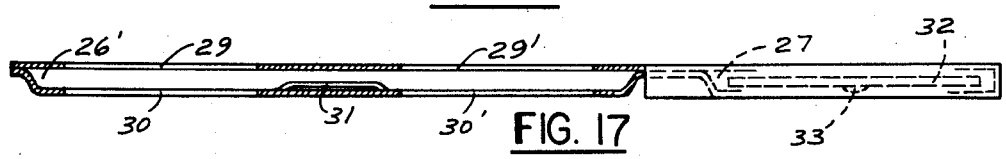

June 29, 1965    M. SCHWARTZ ETAL    3,191,494
COMBINED PHOTOGRAPHIC TRANSPARENCY AND
STATIONARY SPIRAL-SHAPED SOUND
TRACK CARRIER SUPPORT FRAME
Original Filed July 9, 1954    3 Sheets-Sheet 3

INVENTORS
MORRIS SCHWARTZ
EDWARD K. KAPRELIAN
BY
ATTORNEYS

United States Patent Office 3,191,494
Patented June 29, 1965

3,191,494
COMBINED PHOTOGRAPHIC TRANSPARENCY AND STATIONARY SPIRAL-SHAPED SOUND TRACK CARRIER SUPPORT FRAME
Morris Schwartz, Plainville, Conn., and Edward K. Kaprelian, Red Bank, N.J., assignors to The Kalart Company Inc., Plainville, Conn.
Application Sept. 14, 1960, Ser. No. 63,710, now Patent No. 3,145,616, dated Aug. 25, 1964, which is a division of application Ser. No. 442,362, July 9, 1954, now Patent No. 2,961,922, dated Nov. 29, 1960. Divided and this application Sept. 20, 1961, Ser. No. 140,178
15 Claims. (Cl. 88—28)

The present invention relates to means for rendering the viewing of photographic transparencies or slides more informative and enjoyable.

Photographic slides may be directly viewed through a viewer or projected by means of a projector. The invention is primarily concerned with the latter method of showing slides which is generally the more effective one.

While a projected slide image, as any picture, is to a certain extent self-explanatory, additional information or comment pertaining to the slide images is often necessary or at least desirable. This is not only true for slide images of technical, scientific or promotional nature but also for slides of more personal interest. The enjoyment of viewing slides will often be greatly enhanced by an accompanying comment on the situation or location depicted on the slide.

While movie film with sound track is well known, both for amateur and professional use, there are not available as far as the applicant is aware, any means for directly associating a slide or other still photograph with a recorded sound message.

Accordingly, one of the principal objects of the invention is to provide novel and improved means associating a slide and a sound track carrier for simultaneous projection and sound reproduction respectively.

A more specific object of the invention is to provide common holder means for holding a slide and a sound track carrier in position for simultaneous projection and sound reproduction respectively.

The term "slide" as used herein, is intended to encompass single picture slides and stereoscopic slides both for black and white and for color projection.

Further objects, features and advantages of the invention will be pointed out hereinafter and set forth in the appended claims forming part of the application.

The present application is a divisional application divided out of our co-pending application Ser. No. 63,710 filed September 14, 1960 now Patent No. 3,145,616 which, in turn, is a divisional application divided out of Patent 2,961,922 granted on application Serial No. 442,362 filed July 9, 1954.

In the accompanying drawings several preferred embodiments of the invention are shown by way of illustration and not by way of limitation.

In the drawings:

FIG. 1 is a plan view of a holder for a slide and a record disc.

FIG. 2 is a section taken on line 2—2 of FIG. 1.

FIG. 3 is a section taken on line 3—3 of FIG. 1.

FIG. 4 is a plan view of a modification of the slide and record disc holder of FIG. 1.

FIG. 5 is a section taken on line 5—5 of FIG. 4.

FIG. 5a is an enlarged fragmentary part of FIG. 5.

FIG. 6 is a section taken on line 6—6 of FIG. 4.

FIG. 7 is a plan view of a holder, part of which constitutes a sound track carrier.

FIG. 8 is a section taken on line 8—8 of FIG. 7.

FIG. 9 is a section taken on line 9—9 of FIG. 7.

FIG. 10 is a plan view of a sound track carrier insertable in a holder according to the invention.

FIG. 11 is a diametrical section of FIG. 10.

FIG. 12 is a plan view of a different kind of a sound track carrier insertable in a holder according to the invention.

FIG. 13 is a section of FIG. 12.

FIG. 14 is a plan view of still another sound track carrier insertable in a holder according to the invention.

FIG. 15 is a diametric section of FIG. 14.

FIG. 15a is an enlarged fragmentary part of FIG. 15.

FIG. 16 is a plan view of a holder according to the invention designed for receiving a stereoscopic slide and a record disc.

FIG. 17 is a section taken on line 17—17 of FIG. 16.

Figures 18, 19:
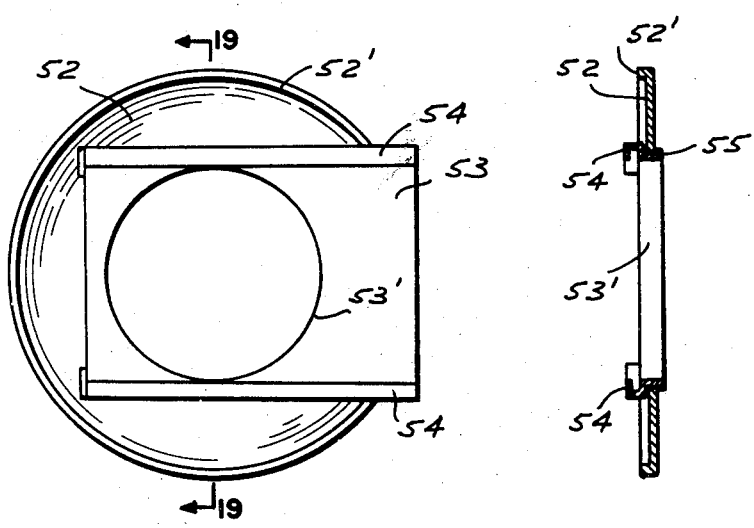
FIG. 18 is a plan view of a modified holder.
FIG. 19 is a section taken on line 19—19 of FIG. 18.

The holders according to FIGS. 1 to 19 inclusive, have in common that each of the holders shown in the respective figures provides means for supporting a slide, either of the single picture type or the stereoscopic type, and a sound track carrier in a spatial relationship such that upon insertion of the holder in an appropriately designed device, the slide and the sound track are held in operational positions for simultaneously projecting the slide and reproducing the intelligence recorded by the sound track. As explained before, such an arrangement according to the invention causes in effect the slide to tell its own story when it is projected thereby giving the showing of slides a new impetus and making it more interesting and informative.

Referring first to FIGS. 1, 2 and 3 in detail, the holder according to these figures comprises a frame 25 made as shown of sheet metal or any other suitable material such as plastic. The frame has a slide or transparency receiving portion 26 and a sound track receiving portion 27. To form these portions, the frame may be dished and the resulting shallow pockets are closed with a back plate 28. The space in frame portion 26 is open at the long edges of the frame to permit the insertion of a slide into said space. Windows 29 and 30 serve to permit projection of a slide inserted in frame portion 26. The slide may be visualized as a conventional slide in which the film proper is mounted in an appropriate frame made for instance of cardboard. The slide is retained in the frame by the margin of the slide frame extending between the respective wall portions of frame 25. The slide may further be releasably retained in frame portion 26 by providing leafsprings 31.

The sound track which is received by frame portion 27 is shown as a record disc 32. This disc may be visualized as being made of or including magnetic sound recording material on which the desired intelligence is magnetically recorded. Appropriate discs will be more fully described hereinafter. The disc is rotatable about a pin 33 extending through the front of the holder 27. The opposite back portion of disc holder 27 is provided with an appropriate depression 34 which acts as a bearing at the rear center of the disc to reduce friction between the disc and back plate 28. As can best be seen in FIG. 1, the disc partly underlies turned over flanges 35 of the frame. It may be centrally rotated or by means of a roller engaging the periphery of the disc. To permit such engagement, holder portion 27 is cut out at 36 and 37.

As appears from the previous description and the figures, the holder supports the slide and the disc in a side-by-side position and permits insertion of the holder with the slide and the disc in such position in one of the devices as shown in FIGS. 20 to 24 inclusive.

The holder according to FIGS. 4 and 5 is similar in principle to the previously described holder.

The holder again comprises a slide receiving portion 26 and a disc receiving portion 27.

The slide receiving portion 26 forms a pocket for insertion of a slide which may be projected through windows 29 and 30. The recording disc 40 is confined by edges of holder portion 27 but is otherwise free. It rotates about pin 33.

The disc may be a disc for magnetic sound recording as has been described in connection with FIGS. 1 to 3; it may also be a disc in which the sound is recorded by cutting of grooves as indicated by the insert drawing associated with FIG. 5. Similarly a disc employing recording grooves may also be employed in connection with the holder according to FIGS. 1 to 3.

As is apparent, the holder according to FIGS. 4 to 6 retains the slide and the recording disc in a side-by-side position in the same manner as the holder of FIGS. 1 to 3.

The holder according to FIGS. 7, 8 and 9 is shown as a single piece frame 41 made of plastic as indicated or sheet metal. The slide supporting portion 42 of the frame is formed with preferably dove-shaped grooves 44 and 45 for slidably receiving and retaining an apertured cover piece 46. A window 47 permits projection of an inserted piece of film 51.

The sound track supporting portion 48 of the frame is integrated with the sound recording and reproducing surface by forming the said surface directly on frame portion 48. The recording surface may be a magnetizable layer formed with guide grooves 49. A guide hole 50 may be provided to facilitate locating of the holder in the slide projecting and sound reproducing device. In this arrangement, the sound recording and reproducing head rotates whereas the recording surface 48 is held stationary.

FIGS. 10 and 11 show a recording disc as may be used with either of the holders according to FIGS. 1 to 4 or with one of the holders shown in FIGS. 16 to 19 inclusive to be described hereinafter.

The disc according to FIGS. 10 and 11 comprises a non-magnetic metallic base 55, a resilient layer 56 which may be made of felt, paper, rubber, rubber composition or suitable plastic and a magnetizable layer 57 made for instance of suitable oxide sheeting. The three layers are cemented or otherwise bonded together, intermediate layer 56 forming a cushion for the sound carrying layer 57. A guide hole 58 which may be in form of a Maltese cross, serves to seat the record pin upon a drive shaft.

FIGS. 12 and 13 show a square shaped recording plate which comprises a non-magnetic base 60 preferably made of aluminum or plastic to which is cemented or bonded a layer 61 made of suitable rubber or plastic impregnated with particles of magnetic material. A guide hole 62 serves to locate the plate in the holder.

The recording disc according to FIGS. 14 and 15 comprises a suitable molded plastic base 65 carrying a recording oxide surface 66 in which are formed guide grooves 67. The disc is provided with a Maltese cross shaped drive opening 58.

The holder according to FIGS. 16 and 17 is similar in principle to the holder according to FIGS. 1, 2 and 3, except that it is designed for a stereoscopic slide. Accordingly, the slide supporting frame portion 26' is broadened to accommodate two pairs of windows 29, 30 and 29' and 30' for the two pictures of a stereoscopic slide. The arrangement of the holder and its function are obvious from the description of the holder according to FIG. 1.

The holder shown in FIGS. 18 and 19 employs an annular disc 52 carrying a magnetic recording surface and provided with a flange 52. The disc is free to revolve about a slide holder part 53 provided with a central opening 53' through which light is projected. Flanges 54 retain an inserted transparency holder in proper position. A flange 55 formed from the rear of holder part 53 holds the disc in correct relation. In use, this holder functions essentially similarly to those previously described. The holder is retained in the projector aperture by any suitably locating surface such as the outer portions of flanges 54. The disc is driven preferably by a friction roller which engages the periphery of flange 52'.

As previously mentioned, all the aforedescribed holders and recording discs therefor are designed for coaction with a slide projecting and sound reproducing device.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

We claim:

1. A device for simultaneous audio-visual reproduction by a sound projector for still pictures, said device comprising a substantially plane frame structure having a first area for supporting a single photographic transparency and a second area for supporting a sound record in a fixed spatial relationship in reference to the transparency, the frame structure being adapted to be inserted in the projector, said first frame area having a window therethrough and including a pocket for receiving a single transparency and holding the same in alignment with the window for projecting the transparency through said window and said second frame area mounting a stationary sound track.

2. A device for simultaneous audio-visual reproduction by a sound projector for still pictures, said device comprising a substantially plane frame structure having a first area for supporting a single photographic transparency and a second area for supporting a sound track in a fixed spatial relationship in reference to the transparency, said frame structure being adapted to be inserted in the projector, said first frame area having a window therethrough and including a pocket for receiving a single transparency and holding the same in alignment with the window for projecting the transparency through said window and said second frame area mounting a stationary, spiral-shaped sound track.

3. A device according to claim 2 wherein said spiral-shaped sound track is a track grooved in one of the sides of the second frame area.

4. A device according to claim 2 where one side of the second frame area is coated with a layer of magnetically conductive oxide, said spiral-shaped sound track being recorded on said layer.

5. A device according to claim 4 where concentric guide grooves are formed in one of the sides of said second frame area.

6. A device for simultaneous audio-visual reproduction by a sound projector for still pictures, said device comprising a substantially plane frame structure having a first portion for supporting a photographic transparency and a second portion for supporting a sound record in a fixed spatial relationship in reference to the transparency, said frame structure being adapted to be inserted in the projector, said first frame portion being composed of two layers defining a pocket therebetween for insertion therein of a single transparency and having a window therethrough in alignment with said pocket for projection of the transparency through said window and said second frame portion mounting on one of its sides a spiral-shaped stationary sound track.

7. A device according to claim 6 wherein said sound track is in the form of a spiral groove in said side of the second frame portion.

8. A device according to claim 6 wherein said side of the second frame portion is coated with a layer of a magnetically conductive oxide, said sound track being magnetically recorded on said layer.

9. A device according to claim 6 wherein said frame structure is generally plate-shaped and said frame portions are disposed in co-planar relationship.

10. A device for simultaneous audio-visual reproduction by a sound projector for still pictures, comprising a rigid frame having a substantially rectangular window therethrough and parallel guide tracks along opposite sides of said window, said frame being adapted to be inserted in the projector and said guide tracks being arranged slidably to receive and to retain therebetween one photographic transparency at a time in registry with said window and stationary relative thereto, said frame having a portion mounting a stationary spiral-shaped sound track.

11. A device according to claim 10 wherein said sound track is in the form of a spiral groove on one side of said frame portion.

12. A device according to claim 10 wherein said frame portion is coated with a magnetically conductive layer of oxide, said spiral-shaped sound track being recorded on said layer.

13. A device according to claim 10 wherein said frame structure is generally plate-shaped and wherein said window and said frame portion are disposed side by side in coplanar relationship.

14. A device for simultaneous audio-visual reproduction by a sound projector for still pictures, comprising a rigid frame having a first portion for supporting a stereoscopic photographic transparency and a second portion for supporting a sound record in fixed spatial relationship in reference to the transparency, said frame being adapted to be inserted in the projector, said first frame portion including a pocket for receiving and retaining a single transparency and having two side-by-side windows, one for each of the picture areas of the transparency, for projecting the same through said windows, and said second frame portion mounting a spiral-shaped stationary sound track.

15. A device according to claim 14 wherein said windows are generally rectangular and parallel guide tracks are disposed on opposite sides of the windows, said guide tracks forming said pocket for slidably receiving and locating the transparency.

References Cited by the Examiner

UNITED STATES PATENTS

| | | | |
|---|---|---|---|
| 1,101,760 | 6/14 | Seemann | 88—28 |
| 1,679,708 | 8/28 | Bullis | 88—16.2 |
| 2,005,914 | 6/35 | Freund | 88—16.2 |
| 2,287,624 | 6/42 | Langenfeld. | |

FOREIGN PATENTS 82,339  1/35  Sweden.

NORTON ANSHER, *Primary Examiner.*

WILLIAM MISIEK, *Examiner.*